US010793000B2

(12) United States Patent
Kondo et al.

(10) Patent No.: US 10,793,000 B2
(45) Date of Patent: Oct. 6, 2020

(54) ELECTRIC VEHICLE (71) Applicant: TATSUMI RYOKI CO., LTD, Tokyo (JP)

(72) Inventors: Toyoshi Kondo, Tokyo (JP); Nobuhide Hamano, Tokyo (JP)

(73) Assignee: TATSUMI RYOKI CO., LTD, Tokyo (JP)

( * ) Notice: Subject to any disclaimer, the term of this patent is extended or adjusted under 35 U.S.C. 154(b) by 0 days.

(21) Appl. No.: 16/858,191

(22) Filed: Apr. 24, 2020

(65) Prior Publication Data
US 2020/0247235 A1 Aug. 6, 2020

Related U.S. Application Data (63) Continuation of application No. PCT/JP2018/040969, filed on Nov. 5, 2018.

(30) Foreign Application Priority Data

Nov. 16, 2017 (JP) .................................. 2017-220712

(51) Int. Cl.
*B60K 15/07* (2006.01)
*C01B 3/26* (2006.01)
(Continued)

(52) U.S. Cl.
CPC ............... B60K 15/07 (2013.01); B60L 7/10 (2013.01); B60L 50/50 (2019.02); B60L 58/32 (2019.02);
(Continued)

(58) Field of Classification Search
CPC ......... B60K 15/07; B60L 50/50; B60L 50/70; B60L 58/32; B60L 7/10; B60M 3/06;
(Continued)

(56) References Cited

U.S. PATENT DOCUMENTS 8,397,680 B2 * 3/2013 Shimada ............... B60W 20/10
123/3

FOREIGN PATENT DOCUMENTS

JP H06-260196 A 9/1994
JP H08-273680 A 10/1996
(Continued)

OTHER PUBLICATIONS

International Search Report issued in PCT/JP2018/040969 dated Jan. 22, 2019 with English Translation (7 pages).
(Continued)

*Primary Examiner* — John D Walters
(74) *Attorney, Agent, or Firm* — Nakanishi IP Associates, LLC (57) ABSTRACT

An electric vehicle which can travel using a power generator that generates electric power based on hydrogen without increasing the size of the hydrogen tank, is provided. An electric vehicle includes a first tank configured to store an organic hydride, a dehydrogenation reactor that has a first passage including a first catalyst for accelerating dehydrogenation reaction of the organic hydride supplied from the first tank and separates the organic hydride supplied to the first passage into hydrogen and an aromatic compound, a power generator configured to generate electric power using hydrogen supplied from the dehydrogenation reactor, a power storage configured to store electric power generated by the power generator, and a motor drivable on electric power from at least one of the power generator and the power storage to rotate a wheel.

13 Claims, 10 Drawing Sheets (51) Int. Cl.
- *B60L 50/50* (2019.01)
- *B60L 58/32* (2019.01)
- *B60L 7/10* (2006.01)
- *B60M 3/06* (2006.01)
- *H01M 8/04029* (2016.01)
- *H01M 8/04858* (2016.01)
- *H01M 8/065* (2016.01)

(52) U.S. Cl.
CPC ............... *B60M 3/06* (2013.01); *C01B 3/26* (2013.01); *H01M 8/04029* (2013.01); *H01M 8/04858* (2013.01); *H01M 8/065* (2013.01); *C01B 2203/066* (2013.01); *H01M 2250/20* (2013.01)

(58) Field of Classification Search
CPC . C01B 3/26; H01M 8/04029; H01M 8/04858; H01M 8/065
USPC ...................................................... 180/65.31
See application file for complete search history.

(56) References Cited

FOREIGN PATENT DOCUMENTS

| | | |
|---|---|---|
| JP | 2005-247764 A | 9/2005 |
| JP | 2015-153730 A | 8/2015 |
| JP | 2017-149316 A | 8/2017 |
| WO | 2015/004827 A1 | 1/2015 |

OTHER PUBLICATIONS

Notice of Reasons for Refusal issued in Japanese Patent Application No. 2019-542633 dated Aug. 30, 2019 with English Translation (4 pages).

\* cited by examiner

ELECTRIC VEHICLE

CROSS-REFERENCE TO RELATED APPLICATIONS

This application is a continuation application of International Patent Application No. PCT/JP2018/040969 filed on Nov. 5, 2018, which claims priority to Japanese Patent Application No. 2017-220712 filed on Nov. 16, 2017, the entire contents of which are incorporated by reference.

TECHNICAL FIELD

The present invention relates to an electric vehicle.

BACKGROUND ART

As described in Patent Literature 1, an electric vehicle which uses fuel cells is suggested.

CITATION LIST

Patent Literature

Patent Literature 1: JP 2017-149316 A

However, since hydrogen used in the fuel cell is limited to that in stored in the hydrogen tank in advance, it was necessary to enlarge the hydrogen tank in order to extend the traveling distance without replenishment.

SUMMARY OF INVENTION

One or more embodiments of the invention provide an electric vehicle which can travel using a power generator that generates electric power based on hydrogen without increasing the size of the hydrogen tank.

An electric vehicle according to one or more embodiments of the present invention includes a first tank configured to store an organic hydride, a dehydrogenation reactor that has a first passage including a first catalyst for accelerating dehydrogenation reaction of the organic hydride supplied from the first tank and separates the organic hydride supplied to the first passage into hydrogen and an aromatic compound, a power generator configured to generate electric power based on hydrogen supplied from the dehydrogenation reactor, a power storage configured to store electric power generated by the power generator, and a motor drivable on electric power from at least one of the power generator and the power storage to rotate a wheel.

Hydrogen used in the power generator can be generated by the dehydrogenation system (the first tank, the dehydrogenation reactor) incorporated in the electric vehicle, so it is not necessary to store large amounts of hydrogen required for traveling in advance.

Therefore, compared to an electric vehicle without such an apparatus which can generate hydrogen, a smaller capacity one as the hydrogen tank, in other words, the hydrogen tank with a smaller size and a lower pressure resistance can be used.

A space for providing the first tank or the like becomes necessary compared to the electric vehicle without such the apparatus which can generate hydrogen. However, the raw material (the organic hydride) and the separated liquid (the aromatic compound) are the same petroleum as gasoline and kerosene, so they can be more easily and safely mounted on a transportation mean such as the electric vehicle compared to hydrogen.

Preferably, the first tank includes a first holder fixed to the electric vehicle, and a first cartridge tank attached to the first holder in a detachable manner.

By using the cartridge tank, the filling of the raw material into the first cartridge tank or other work can be performed at a location away from the electric vehicle. By replacement of the cartridge tanks, thus oil refilling or the like can be performed quickly.

More preferably, the first holder includes a door in a region facing the first cartridge tank for introducing a liquid from the first cartridge tank into the first holder. The door is urged upward in a closing direction and is opened by a weight applied from above.

Vaporizing the raw material or the like from the tank can be prevented.

In addition, preferably, the electric vehicle further includes a second tank configured to store at least one of the aromatic compound resulting from separation of hydrogen from the organic hydride, and the organic hydride. The second tank includes a holder fixed to the electric vehicle, and a cartridge tank attached to the holder in a detachable manner. One of two sections in a single cartridge tank divided by a movable partition is used as the first cartridge tank and another of the two sections is used as the cartridge tank.

In a case that the separated liquid (the aromatic compound or the organic hydride) generated from the raw material increases resulting from the dehydrogenation reaction, a space (the cartridge tank) for storing said separated liquid can be enlarged by effectively using the space of decreased said raw material.

In addition, preferably, a hydrogen tank to store hydrogen separated from the organic hydride through the dehydrogenation reactor is smaller than the first tank.

In addition, preferably, the electric vehicle further includes a second tank configured to store at least one of the aromatic compound resulting from separation of hydrogen from the organic hydride, and the organic hydride. One of two sections in a single tank divided by a movable partition is used as the first tank and another of the two sections is used as the second tank.

In a case that the separated liquid (the aromatic compound or the organic hydride) generated from the raw material increases resulting from the dehydrogenation reaction, a space (the second tank) for storing said separated liquid can be enlarged by effectively using the space of decreased said raw material.

In addition, preferably, the electric vehicle further includes a second tank configured to store at least one of the aromatic compound resulting from separation of hydrogen from the organic hydride and the organic hydride as fuel, an outside-air intake unit, a heat exchange unit including a first heat exchanger and a second heat exchanger, and a heating device configured to heat an interior of the electric vehicle. The dehydrogenation reactor has a second passage adjacent to the first passage. The second passage includes a second catalyst for accelerating combustion of a mixture of the fuel supplied from the second tank and air supplied from the outside-air intake unit. Heat resulting from combustion in the second passage is transferred to the first passage. The first heat exchanger and the second heat exchanger are located on a discharge path of the second passage. The first heat exchanger is used for heat exchange between heat discharged from the second passage and air drawn through the outside-air intake unit. The second heat exchanger is used for heat exchange between heat discharged from the second passage and a heating medium in the heating device.

When the combustion of the fuel-air mixture in the second passage of the dehydrogenation reactor is sufficiently performed, the temperature of the gas discharged from the outlet of the second passage of the dehydrogenation reactor becomes high. Thus the heating medium of the heating device can be heated by the heat exchange in the second heat exchanger.

More preferably, the first heat exchanger is nearer an outlet of the second passage than the second heat exchanger.

Thereby, heat exchange can be performed so that the air drawn by the outside-air intake unit reaches a higher temperature than the heating medium in the heating device.

In addition, preferably, the motor functions as an electric brake during braking, and the generated electric power is stored in the power storage.

In addition, preferably, the electric vehicle further includes a device connectable to a power transmission line. One of the power generator, the power storage, and the motor transmits electrical energy to the power transmission line through the device.

One or more embodiments of the present invention provide an electric vehicle which can travel using a power generator that generates electric power based on hydrogen without increasing the size of the hydrogen tank.

DETAILED DESCRIPTION

A first embodiment will now be described with reference to the drawings (FIG. 1 to FIG. 8). An electric vehicle 1 according to the first embodiment includes a dehydrogenation system 10, a power generator 51, a power storage 52, a motor 53, wheels 55, a heating device 57, and an operation unit 59.

Figure 1:
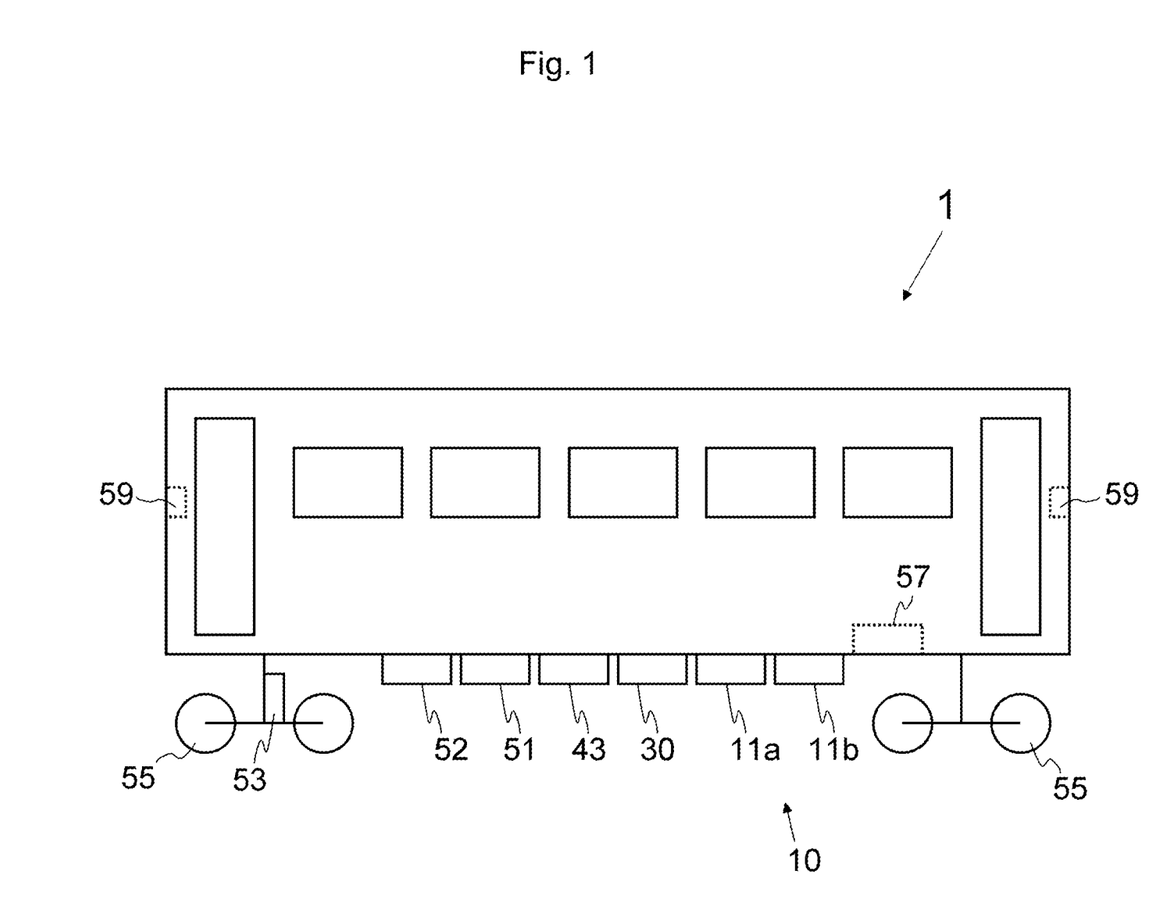
FIG. 1 is a side view of an electric vehicle according to a first embodiment.

The electric vehicle 1 may be a vehicle that carries passengers or the like in the vehicle, or may be a locomotive that pulls a freight vehicle or the like.

In the first embodiment, the dehydrogenation system 10 and other components are located under the floor of the electric vehicle 1. However, the arrangement position of each member is not limited to this.

A part of the members included in the dehydrogenation system 10, such as a first tank 11a, may be mounted on a vehicle pulled by a locomotive, such as a tank car.

Figure 2:
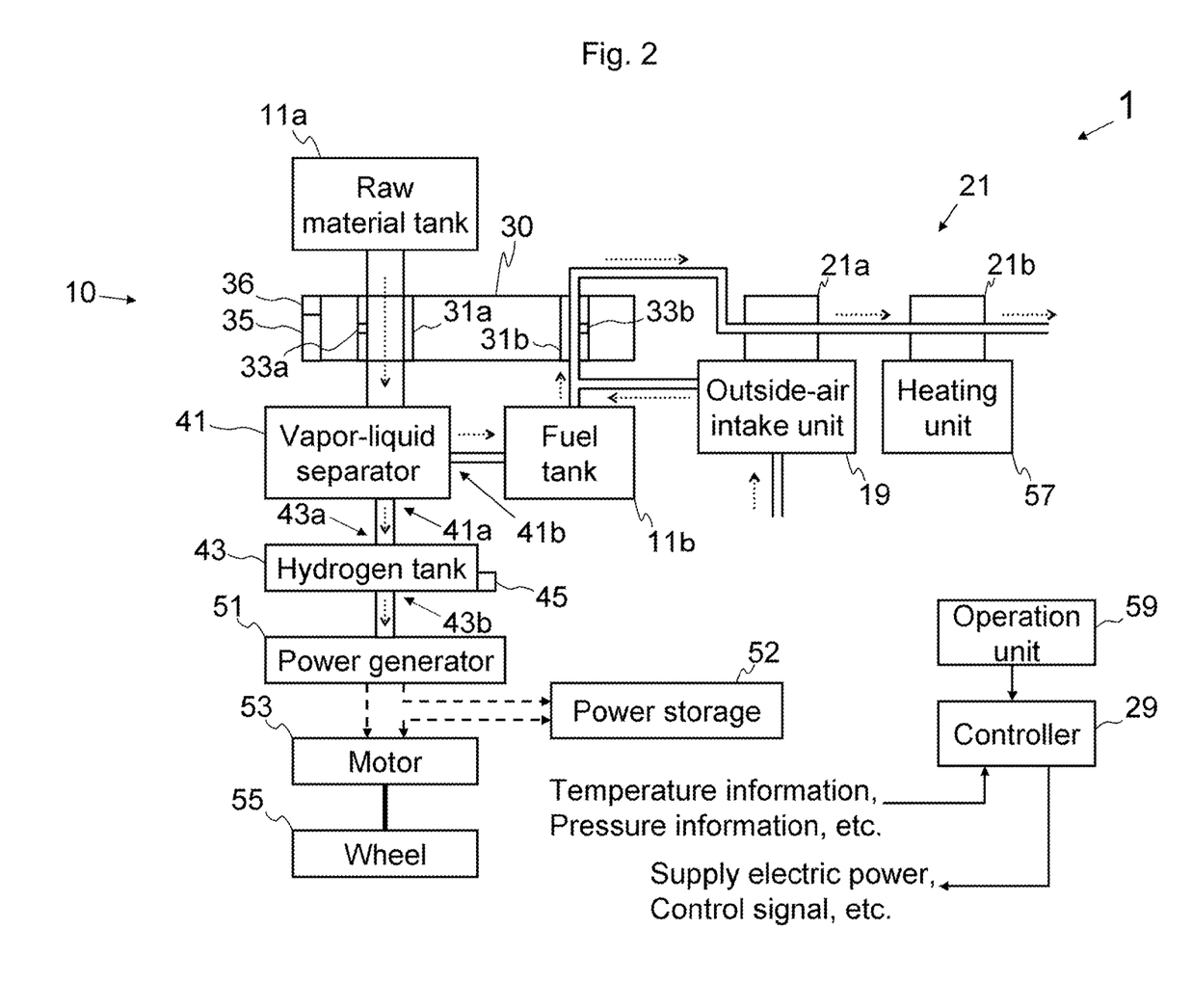
FIG. 2 is a schematic view illustrating a configuration of the electric vehicle according to the first embodiment.

The dehydrogenation system 10 is an apparatus that extracts hydrogen from an organic hydride (saturated condensed ring hydrocarbon), such as methylcyclohexane (MCH), and supplies said extracted hydrogen to the power generator 51. The dehydrogenation system 10 includes the first tank (raw material (MCH) tank) 11a, a second tank (fuel/separated liquid (MCH/TOL) tank) 11b, an outside-air intake unit 19, a heat exchange unit 21 (a first heat exchanger 21a and a second heat exchanger 21b), a controller 29, a dehydrogenation reactor 30, a vapor-liquid separator 41, and a hydrogen tank 43. The dehydrogenation reactor 30 includes a first passage 31a, a second passage 31b, a first catalyst (dehydrogenation catalyst) 33a, a second catalyst (combustion catalyst) 33b, a heater 35, and a temperature sensor 36.

The first tank 11a is a tank which stores an organic hydride. The organic hydride stored in the first tank 11a is supplied to the first passage 31a of the dehydrogenation reactor 30 through a raw material pump (not shown), and is separated to hydrogen and an aromatic compound such as toluene, by dehydrogenation reaction in the dehydrogenation reactor 30.

The second tank 11b is a tank which stores fuel. The fuel stored in the second tank 11b is supplied to the second passage 31b of the dehydrogenation reactor 30 through a fuel pump (not shown), and burns in the second passage 31b so as to heat the first catalyst 33a which accelerates the dehydrogenation reaction of the organic hydride.

The fuel includes the organic hydride that is an object for the dehydrogenation reaction and an aromatic compound such as toluene resulting from the dehydrogenation reaction. The fuel is supplied from the vapor-liquid separator 41 (described later).

Although the aromatic compound or the like generated by the dehydrogenation reaction may be used as the fuel, an aromatic compound or the like stored in the second tank 11b from outside may also be used as the fuel.

The outside-air intake unit 19 includes a blower (not shown), and draws outside air using said blower to supply to the first heat exchanger 21a.

Note, it is desirable that a device (a heater for drawn-air (not shown)) which heats air drawn by said blower is provided in the outside-air intake unit 19.

The heat exchange unit 21 (the first heat exchanger 21a and the second heat exchanger 21b) is located on the discharge path of the second passage 31b in the dehydrogenation reactor 30. The first heat exchanger 21a is nearer the outlet of the second passage 31b in the dehydrogenation reactor 30 than the second heat exchanger 21b.

Thus, heat exchange can be performed so that the air drawn by the outside-air intake unit 19 reaches a higher temperature than a heating medium in the heating device 57.

The first heat exchanger 21a takes in exhaust gas (carbon dioxide and water vapor) resulting from combustion in the second passage 31b. The first heat exchanger 21a uses said high-temperature exhaust gas to heat air supplied from the outside-air intake unit 19 and supplies the heated air to the second passage 31b.

Thus, a fuel-air mixture is supplied to the second passage 31b.

The second heat exchanger 21b takes in exhaust gas (carbon dioxide and water vapor) resulting from combustion in the second passage 31b and uses said high-temperature exhaust gas to heat the heating medium (e.g., warm water) in the heating device 57.

Immediately after the operation of the dehydrogenation system 10 starts, the combustion of the fuel-air mixture in the second passage 31b of the dehydrogenation reactor 30 is not sufficiently performed. Since the temperature of the gas discharged from the outlet of the second passage 31b of the dehydrogenation reactor 30 has not been high yet, the air from the outside-air intake unit 19 cannot be sufficiently heated by the heat exchange in the first heat exchanger 21a.

Therefore, it is necessary to heat the air drawn by the outside-air intake unit 19 using by the heater for drawn-air.

When the combustion of the fuel-air mixture in the second passage 31b of the dehydrogenation reactor 30 is sufficiently performed, the temperature of the gas discharged from the outlet of the second passage 31b of the dehydrogenation reactor 30 becomes high. Thus, the air drawn by the outside-air intake 19 can be heated by the heat exchange in the first heat exchanger 21a.

In this case, it is not necessary to heat the air drawn by the outside-air intake unit 19 using by the heater for drawn-air.

Immediately after the operation of the dehydrogenation system 10 starts, the combustion of the fuel-air mixture in the second passage 31b of the dehydrogenation reactor 30 is not sufficiently performed. Since the temperature of the gas discharged from the outlet of the second passage 31b of the dehydrogenation reactor 30 has not been high yet, the heating medium of the heating device 57 cannot be sufficiently heated by the heat exchange in the second heat exchanger 21b.

Therefore, it is necessary to heat the heat medium of the heating device 57 using by a heater for heating device provided in the heating device 57.

When the combustion of the fuel-air mixture in the second passage 31b of the dehydrogenation reactor 30 is sufficiently performed, the temperature of the gas discharged from the outlet of the second passage 31b of the dehydrogenation reactor 30 becomes high. Thus the heating medium of the heating device 57 can be heated by the heat exchange in the second heat exchanger 21b.

In this case, it is not necessary to heat the heating medium of the heating device 57 by the heater for heating device.

The exhaust gas is cooled through heat exchange with the air drawn by the outside-air intake unit 19 and heat exchange with the heating medium of the heating device 57, and then is discharged outside.

The controller 29 is a device such as a CPU which controls the components of the electric vehicle 1. In particular, the controller 29 performs a supply control of raw material from the first tank 11a to the dehydrogenation reactor 30 and a power supply control to the motor 53, based on an operating state of the electric vehicle 1, an operating state of the operation unit 59, an operating state of the dehydrogenation system 10 (an activation state of the dehydrogenation reaction), and a filling state of hydrogen in the hydrogen tank 43.

A determination of the operating state of the dehydrogenation system 10 (the activation state of the dehydrogenation reaction), in other words, a determination whether the dehydrogenation reaction in the dehydrogenation reactor 30 is activated is performed based on such as an elapsed time after the dehydrogenation system 10 stars, a temperature in the first passage 31a or of the heater 35, or a flow rate passing through a gas outlet 41a of the vapor-liquid separator 41.

A determination of the filling state of hydrogen in the hydrogen tank 43, in other words, a determination whether hydrogen is sufficiently filled into the hydrogen tank 43 is performed based on such as a pressure state in the hydrogen tank 43, or a difference between the flow rate of hydrogen passing through an inlet 43a of the hydrogen tank 43 to flow into the hydrogen tank 43 and the flow rate of hydrogen passing through an outlet 43b of the hydrogen tank 43 to discharge from the hydrogen tank 43.

In the first embodiment, an example is shown that a pressure sensor 45 is provided in the hydrogen tank 43, a pressure state in the hydrogen tank 43 is detected, and the filling state of hydrogen in the hydrogen tank 43 is determined based on this.

For example, in the case that filing hydrogen into the hydrogen tank 43 is not sufficient and that the dehydrogenation reaction in the dehydrogenation system 10 is activated, the controller 29 performs a larger supply of raw material from the first tank 11a to the dehydrogenation reactor 30.

In the case that a storage state (e.g., power storage amount) of the power storage 52 is not sufficient, or that it is in the operating state for traveling the electric vehicle 1, the controller 29 supplies hydrogen from the hydrogen tank 43 to the power generator 51, to make the power generator 51 supply power to the power storage 52 or the motor 53.

The dehydrogenation reactor 30 has a substantially tubular shape and a tubular structure, and includes the first passage 31a, the second passage 31b, the first catalyst (the dehydrogenation catalyst) 33a, the second catalyst (the combustion catalyst) 33b, the heater 35, and the temperature sensor 36.

The first passage 31a is a passage through which the organic hydride that is an object for the dehydrogenation reaction passes. The first catalyst (the dehydrogenation catalyst) 33a such as platinum for accelerating the dehydrogenation reaction is provided in the passage. The heater 35 for heating the first catalyst 33a and the organic hydride in the first passage 31a is provided on an outer wall surface (or an inner wall surface) of the first passage 31a.

As the organic hydride passes through in the first passage 31a, the dehydrogenation reaction is accelerated by the first catalyst 33a so that hydrogen is separated from the organic hydride. Hydrogen and the aromatic compound resulting from the dehydrogenation reaction, and the unreacted residual organic hydride are discharged from the outlet of the first passage 31a, and then these are supplied to the vapor-liquid separator 41.

The second passage 31b is a passage through which the fuel-air mixture that is an object for combustion passes. The second catalyst (the combustion catalyst) 33b such as platinum for accelerating combustion of the fuel is provided in the passage.

With the fuel-air mixture combustion inside the second passage 31b, the nearby first passage 31a, and the first catalyst 33a and the organic hydride in the first passage 31a are heated.

To improve the efficiency of heat transfer, it is desirable that a portion between the first passage 31a and the second passage 31b consists of a material having high heat conductivity, such as metal.

The first catalyst 33a is formed pleated, latticed, honeycombed, fin-shaped or the like, and is supported by the first passage 31a. The second catalyst 33b is formed pleated, latticed, honeycombed, fin-shaped or the like, and is supported by the second passage 31b.

The heater 35 is used to heat the first passage 31a and the first catalyst 33a.

The temperature sensor 36 detects information about the temperature inside the first passage 31a or the temperature of the heater 35.

Said temperature information is transmitted to the controller 29 and used to perform such as the raw material supply control from the first tank 11a to the dehydrogenation reactor 30.

The vapor-liquid separator 41 separates the mixture of gas (hydrogen) and liquid (the aromatic compound and the organic hydride) discharged from the first passage 31a in the dehydrogenation reactor 30. The gas (hydrogen) is discharged to the hydrogen tank 43 from the gas outlet 41a, and the liquid (the aromatic compound and the organic hydride) is discharged to the second tank 11b from a liquid outlet 41b.

A chiller drivable by the power generator 51 or the power storage 52 may be provided upstream of the vapor-liquid separator 41 (a pipe connecting communicatively with the dehydrogenation reactor 30) or downstream of the vapor-liquid separator 41 (a pipe connecting communicatively with the hydrogen tank 43, a pipe connecting communicatively with the second tank 11b) to cool the liquid and the gas discharged from the dehydrogenation reactor 30.

The hydrogen tank 43 is a tank which stores hydrogen separated by the vapor-liquid separator 41.

Hydrogen used in the power generator 51 is filled up as needed by using the organic hydride stored in the raw material tank 11. Thus, it is not necessary to use a large one as the hydrogen tank 43, for example, the hydrogen tank 43 may be smaller than the raw material tank 11a.

The power generator 51 is an apparatus such as a hydrogen power generator and a fuel cell which generates electric power based on hydrogen supplied from the hydrogen tank 43 and which supplies said electric power to the power storage 52 and the motor 53.

The power storage 52 includes a battery, a capacitor or the like, and stores electric power generated by the power generator 51 and regenerative electric power generated by the motor 53 during braking. The power storage 52 supplies electric power to the electrical components included in the electric vehicle 1 (such as the raw material pump, the fuel pump, the outside-air intake unit 19, the controller 29, the heater 35, the temperature sensor 36, the vapor-liquid separator 41, and the motor 53).

The motor 53 operates based on electric power generated by the power generator 51 and electric power stored in the power storage 52 and provides a rotational force to the wheels 55.

Under a high load during acceleration for example, the motor 53 operates on electric power generated by the power generator 51 and electric power stored in the power storage 52.

Under a low load during coasting for example, the motor 53 operates on either electric power generated by the power generator 51 or electric power stored in the power storage 52.

During braking, the motor 53 functions as an electric brake, and the generated electric power (regenerated electric power) is stored in the power storage 52.

The wheels 55 are rotated by the rotational force transmitted from the motor 53 and thus the electric vehicle 1 runs.

The heating device 57 heats the interior of the electric vehicle 1.

The operation unit 59 is used to operate for starting and stopping the electric vehicle 1.

In the first embodiment, hydrogen used in the power generator 51 can be generated by the dehydrogenation system 10 incorporated in the electric vehicle 1, so it is not necessary to store large amounts of hydrogen required for traveling in advance.

Therefore, compared to an electric vehicle without such an apparatus which can generate hydrogen, a smaller capacity one as the hydrogen tank 43, in other words, the hydrogen tank 43 with a smaller size and a lower pressure resistance can be used.

A space for providing the first tank 11a and the second tank 11b becomes necessary compared to the electric vehicle without such the apparatus which can generate hydrogen. However, the raw material (the organic hydride) and the fuel/separated liquid (the aromatic compound) are the same petroleum as gasoline and kerosene, so they can be more easily and safely mounted on a transportation mean such as the electric vehicle 1 compared to hydrogen.

Figure 3:
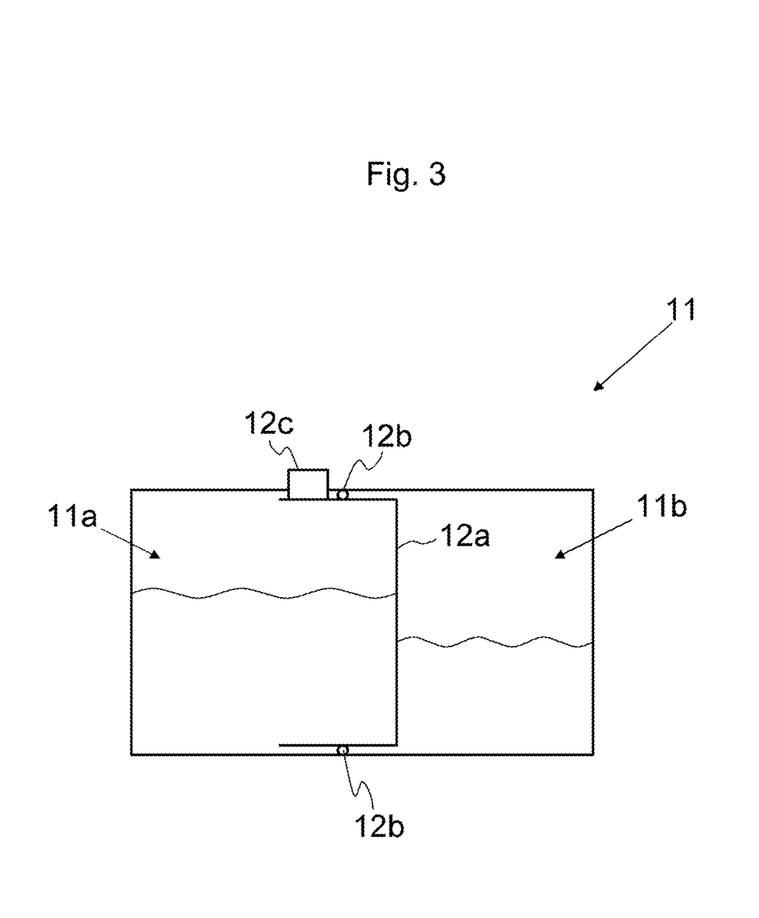
FIG. 3 is a schematic view of a single tank divided into a first tank and a second tank by a partition according to the first embodiment, with the first tank being larger.
Figure 4:
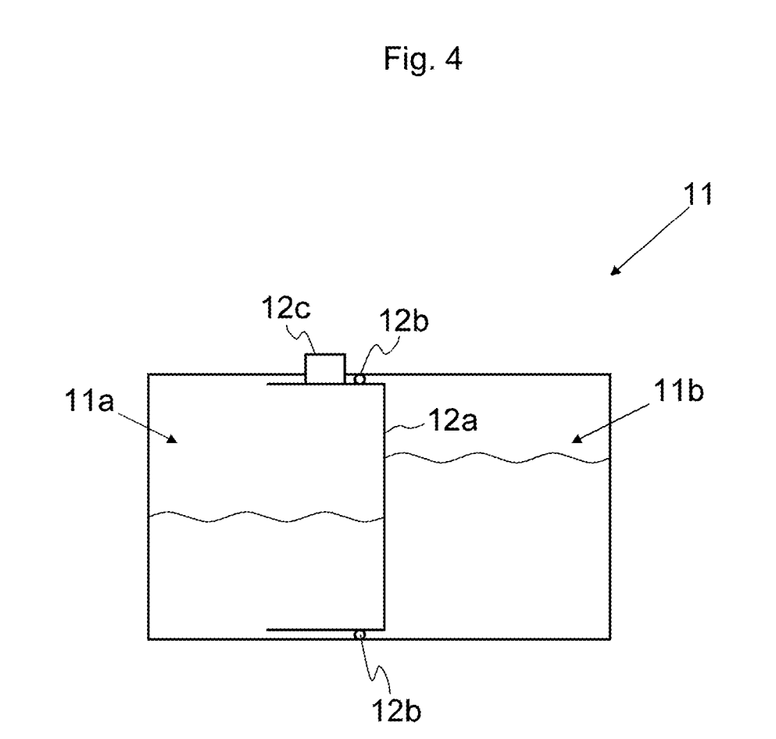
FIG. 4 is a schematic view of the single tank divided into the first tank and the second tank by the partition according to the first embodiment, with the first tank being smaller.

Note, the first tank 11a and the second tank 11b may consist of separated tanks. However, one of two sections in a single tank 11 divided by a movable partition 12a may be used as the first tank 11a and another of the two sections may be used as the second tank 11b.

In this case, in a state before the dehydrogenation system 10 is operated, the amount of the raw material (the organic hydride) is large. Therefore, the partition 12a is arranged so that the first tank 11a becomes large (see FIG. 3).

In a state after the dehydrogenation system 10 stars its operation, the amount of the raw material becomes small. Therefore, the partition 12a is arranged so that the first tank 11a becomes small (see FIG. 4).

In a case that the fuel (the aromatic compound or the organic hydride) generated from the raw material increases resulting from the dehydrogenation reaction, a space (the second tank 11b) for storing said fuel can be enlarged by effectively using the space of decreased said raw material.

A seal member 12b such as an O-ring for retaining hermeticity, is provided between the partition 12a and the tank 11.

Although the movement of the partition 12a is performed electrically by an actuator 12c, the partition 12a may be moved by an internal pressure.

Note, in FIG. 3 and FIG. 4, pipes for communicatively connecting the tank and external devices (such as the dehydrogenation reactor 30), an inlet of the tank, and an outlet of the tank are omitted.

The first tank 11a and the second tank 11b may be fixed to the electric vehicle 1, or each of them may include a cartridge tank detachable from the electric vehicle 1.

Figure 5:
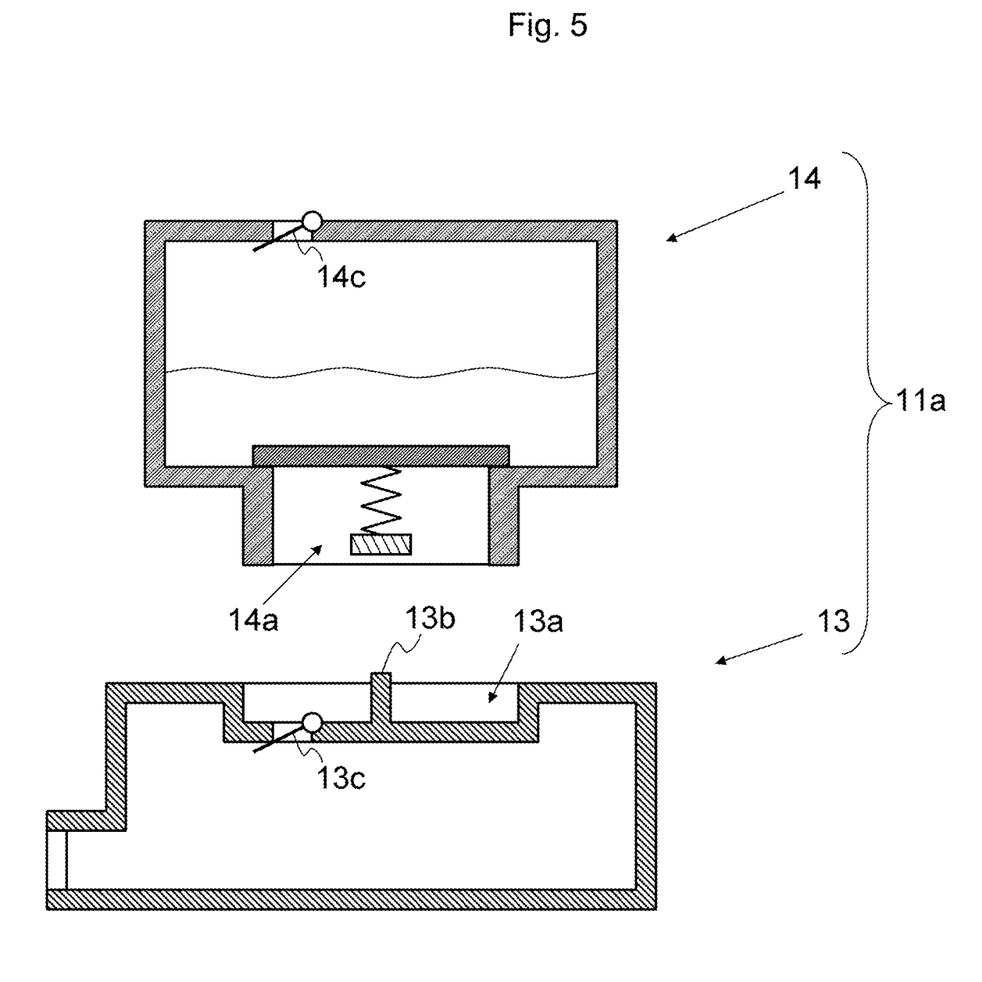
FIG. 5 is a cross-sectional configuration view of a first cartridge tank and a first cartridge holder according to the first embodiment before attachment.
Figure 6:
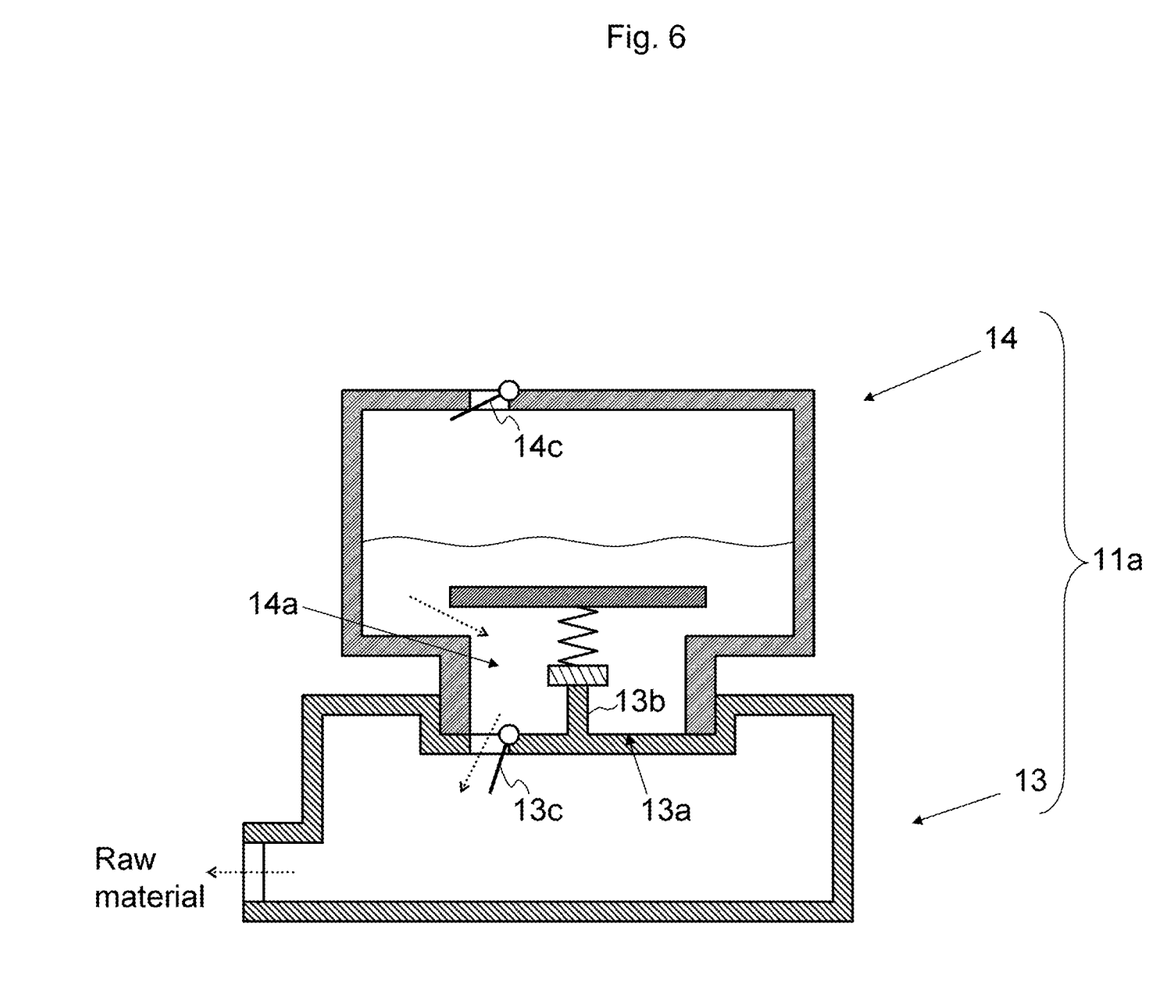
FIG. 6 is a cross-sectional configuration view of the first cartridge tank and the first cartridge holder according to the first embodiment after attachment.

Specifically, the first tank 11a includes a first holder (a first cartridge holder 13) and a first cartridge tank 14 (see FIG. 5 and FIG. 6).

The first cartridge holder 13 is fixed to the electric vehicle 1 and the first cartridge tank 14 is attached while being placed on the first cartridge holder 13.

The first cartridge holder 13 connects communicatively with the first passage 31a in the dehydrogenation reactor 30.

A tray (a first tray 13a) for the first cartridge tank 14 is provided in a region facing the first cartridge tank 14 in the upper portion of the first cartridge holder 13. A pin (a first pin 13b) for opening a first discharge port 14a and an injection port (a first injection port 13c) for introducing the raw material discharged from the first discharge port 14a into the first cartridge holder 13 are provided in the first tray 13a.

An opening/closing door which is urged upward in a closing direction and which is opened by a weight applied from above, is provided in the first injection port 13c.

The first discharge port 14a which is urged downward in a closing direction and which is opened by press applied from below, is provided at the lower portion of the first cartridge tank 14.

An injection port (a raw material injection port 14c) for introducing the raw material from outside into the first cartridge tank 14 is provided at the upper portion of the first cartridge tank 14.

An opening/closing door which is urged upward in a closing direction and which is opened by a weight applied from above, is provided in the raw material injection port 14c.

However, the raw material injection port 14c may consist of another opening/closing structure such as a cap which is detachable by rotation.

In a state before the first cartridge tank 14 is placed on the first cartridge holder 13, the first discharge port 14a is closed. In a state after the first cartridge tank 14 is placed on the first cartridge holder 13, the first pin 13b of the first cartridge holder 13 opens the first discharge port 14a.

The raw material stored in the first cartridge tank 14 then flows into the first cartridge holder 13 through the first discharge port 14a by pushing down and opening the first injection port 13c.

The raw material flowing into the first cartridge holder 13 is supplied to the first passage 31a in the dehydrogenation reactor 30 through the raw material pump (not shown), and separated into hydrogen and an aromatic compound.

Figure 7:
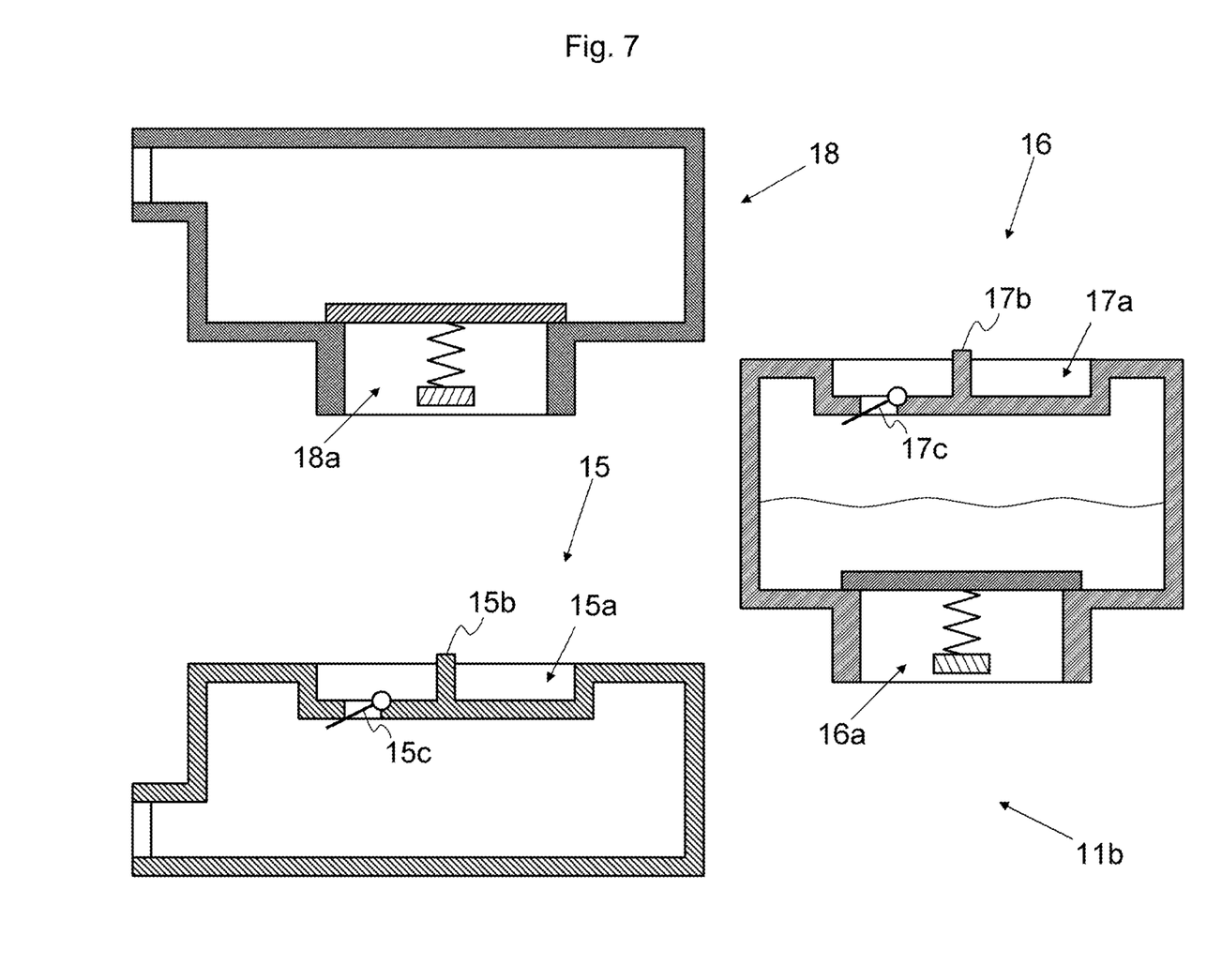
FIG. 7 is a cross-sectional configuration view of a cartridge tank, a cartridge holder, and a fuel supply unit according to the first embodiment before attachment.
Figure 8:
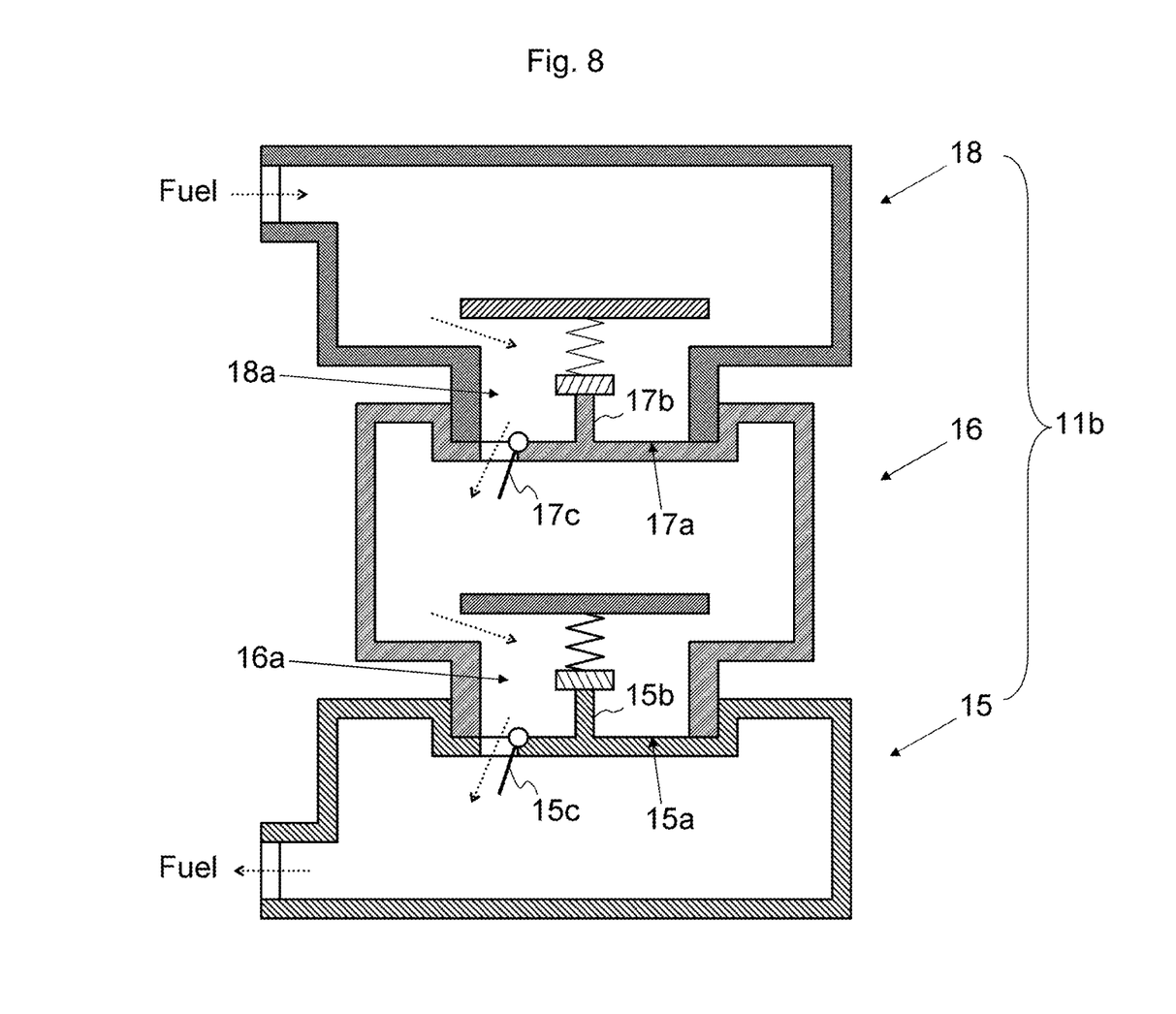
FIG. 8 is a cross-sectional configuration view of the cartridge tank, the cartridge holder, and the fuel supply unit according to the first embodiment after attachment.

The second tank 11b includes a holder (a cartridge holder 15 and a fuel supply unit 18) and a cartridge tank 16 (see FIG. 7 and FIG. 8).

The cartridge holder 15 and the fuel supply unit 18 are fixed to the electric vehicle 1. The cartridge tank 16 is attached while being pinched vertically between the fuel supply unit 18 and the cartridge holder 15.

The cartridge holder 15 connects communicatively with the second passage 31b in the dehydrogenation reactor 30.

The fuel supply unit 18 connects communicatively with the liquid outlet 41b of the vapor-liquid separator 41.

A tray (a second tray 15a) for the cartridge tank 16 is provided in a region facing the cartridge tank 16 in the upper portion of the cartridge holder 15. A pin (a second pin 15b) for opening a second discharge port 16a of the cartridge tank 16 and an injection port (a second injection port 15c) for introducing the fuel discharged from the second discharge port 16a into the cartridge holder 15 are provided in the second tray 15a.

An opening/closing door which is urged upward in a closing direction and which is opened by a weight applied from above, is provided in the second injection port 15c.

The second discharge port 16a which is urged downward in a closing direction and which is opened by press applied from below, is provided at the lower portion of the cartridge tank 16.

A tray (a third tray 17a) for the fuel supply unit 18 is provided in a region facing the fuel supply unit 18 in the upper portion of the cartridge tank 16. A pin (a third pin 17b) for opening a third discharge port 18a of the fuel supply unit 18 and an injection port (a third injection port 17c) for introducing the fuel discharged from the third discharge port 18a into the cartridge tank 16 are provided in the third tray 17a.

An opening/closing door which is urged upward in a closing direction and which is opened by a weight applied from above, is provided in the third injection port 17c.

The third discharge port 18a which is urged downward in a closing direction and which is opened by press applied from below, is provided at the lower portion of the fuel supply unit 18.

In a state before the cartridge tank 16 is placed on the cartridge holder 15, the second discharge port 16a is closed. In a state after the cartridge tank 16 is placed on the cartridge holder 15, the second pin 15b of the cartridge holder 15 opens the second discharge port 16a.

The fuel stored in the cartridge tank 16 then flows into the cartridge holder 15 through the second discharge port 16a by pushing down and opening the second injection port 15c.

The fuel flowing into the cartridge holder 15 is supplied to the second passage 31b in the dehydrogenation reactor 30 through the fuel pump (not shown), and combusts.

In a state before the cartridge tank 16 is attached to the fuel supply unit 18, the third discharge port 18a is closed. In a state after the cartridge tank 16 was attached to the fuel supply unit 18, the third pin 17b of the cartridge tank 16 opens the third discharge port 18a.

The fuel supplied from the vapor-liquid separator 41 to the fuel supply unit 18 then flows into the cartridge tank 16 through the third discharge port 18a by pushing down and opening the third injection port 17c.

By using the cartridge tank, the filling of the raw material into the first tank 11a (the first cartridge tank 14) and the removal of the fuel from the second tank 11b (the cartridge tank 16) can be performed at a location away from the electric vehicle 1. By replacement of the cartridge tanks, thus oil refilling and oil disposal can be performed quickly.

The opening/closing door which is closed while no load from above is applied and which is opened while load (for example the weight of the liquid) from above is applied, is provided at the cartridge holder or the like. Thus, vaporizing the raw material or the like from the tank (cartridge tank, cartridge holder) can be prevented.

Note, the example that the first cartridge tank 14 and the cartridge tank 16 consist of separated tanks is described, in FIG. 5 to FIG. 8. However, one of two sections in a single cartridge tank divided by a movable partition may be used as the first cartridge tank 14 and another of the two sections may be used as the cartridge tank 16.

An operational procedure of the dehydrogenation system 10 will now be described.

The operation of the dehydrogenation system 10 may be controlled manually by the user (the driver or the like) operating the operation unit 59 or automatically based on the operating state of the electric vehicle 1 (travel speed, travel acceleration, the storage state of the power storage 52, or the like).

An organic hydride as a raw material is stored in the first tank 11a through the raw material injection port 14c, in advance.

In the case that the single tank 11 and the partition 12a define the first tank 11a and the second tank 11b, the controller 29 drives the actuator 12c to allocate a larger space to the first tank 11a.

It is desirable that an organic hydride or an aromatic compound as fuel is stored in the second tank 11b, in advance. However, the organic hydride and the aromatic compound are supplied to the second tank 11b through the vapor-liquid separator 41, during operation. Therefore, these may not be stored in advance.

The dehydrogenation system 10 is now operated.

Specifically, the controller 29 drives the raw material pump or the like, supplies the raw material (the organic hydride) inside the first tank 11a to the first passage 31a by using the raw material pump, supplies the fuel (the organic hydride and the aromatic compound) in the second tank 11b to the second passage 31b by using the fuel pump, supplies the outside-air to the second passage 31b through first heat exchanger 21a by using the outside-air intake unit 19, and operates the heater 35 and the vapor-liquid separator 41.

During a first period T1 from when the dehydrogenation system 10 operates to when the dehydrogenation reaction is activated, the temperature of the first catalyst 33a is low and the dehydrogenation reaction has not been activated yet. Therefore, most of the organic hydride supplied from the first tank 11a does not undergo the dehydrogenation reaction and does not separate into hydrogen and an aromatic compound.

Thus, the substance supplied to the vapor-liquid separator 41 from the first tank 11a through the dehydrogenation reactor 30 is mostly stored in the second tank 11b in the form of organic hydride.

When the first period T1 elapses after the dehydrogenation system 10 operates, the temperature of the first catalyst 33a is high and the dehydrogenation reaction has already been activated. Therefore, most of the organic hydride supplied from the first tank 11a undergoes the dehydrogenation reaction and is separated into hydrogen and an aromatic compound.

Thus, hydrogen contained in the substance supplied to the vapor-liquid separator 41 from the first tank 11a through the dehydrogenation reactor 30 is stored in the hydrogen tank 43, whereas the aromatic compound and the organic hydride are stored in the second tank 11b.

The aromatic compound and the organic hydride stored in the second tank 11b are used for combustion in the dehydrogenation reactor 30.

In the case that the single tank 11 and the partition 12a define the first tank 11a and the second tank 11b, the controller 29 drives the actuator 12c to allocate a smaller space to the first tank 11a.

Hydrogen stored in the hydrogen tank 43 is supplied to the power generator 51.

The power generator 51 generates electric power based on hydrogen supplied from the hydrogen tank 43 and oxygen in the air.

Electric power generated by the power generator 51 and electric power stored in the power storage 52 are used to drive the motor 53 or the like.

The motor 53 rotates the wheels 55 to move the electric vehicle 1.

In the first embodiment, it is described that the second catalyst 33b is heated by using combustion of the fuel stored in the second tank 11b, and thus the first catalyst 33a is also heated so that the dehydrogenation reaction is activated. However, the first catalyst 33a may be heated by using only Joule heat of the heater 35 or the like without said combustion (a second embodiment, see FIG. 9).

Figure 9:
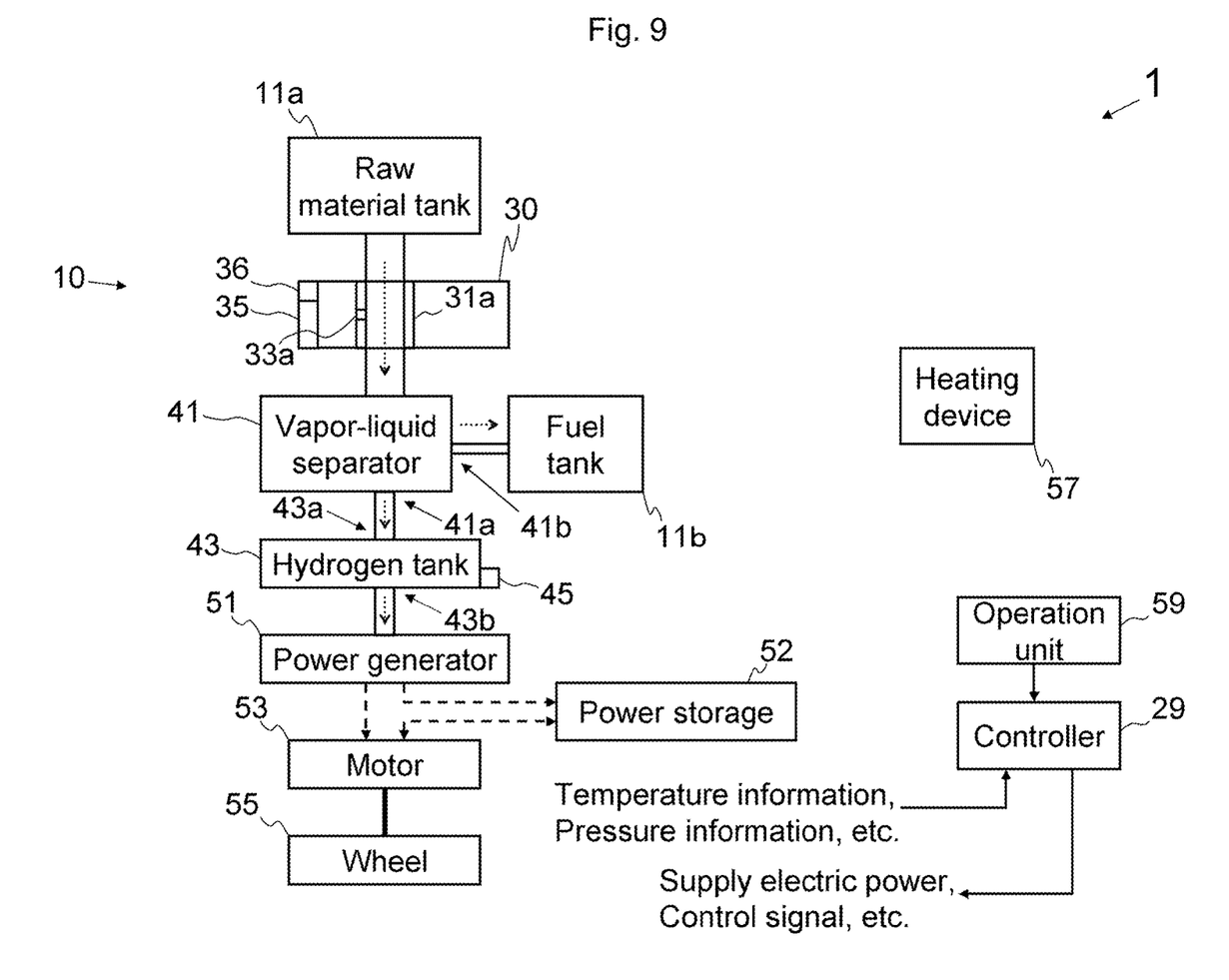
FIG. 9 is a schematic view illustrating a configuration of an electric vehicle according to a second embodiment.

In this case, the device for fuel combustion (the second passage 31b in the dehydrogenation reactor 30) becomes unnecessary, so a possibility of an accident such as a fire can be reduced compared to the first embodiment.

As the dehydrogenation reaction proceeds, the raw material stored in the first tank 11a decreases, and the separated liquid (fuel) stored in the second tank 11b increases. Thus, as shown in FIG. 3 and FIG. 4, it is desirable to vary the capacity of each tank by using the movable partition 12a.

In the first and second embodiments, it is described that the electrical energy generated during braking is stored in the power storage 52. However, a device (a current collector 61) which connects with a power transmission line 90 such as an aerial power line (a railway overhead line) and a power supplying rail (a third rail), may be provided to transfer said electrical energy to the power transmission line 90 (a third embodiment, see FIG. 10).

Figure 10:
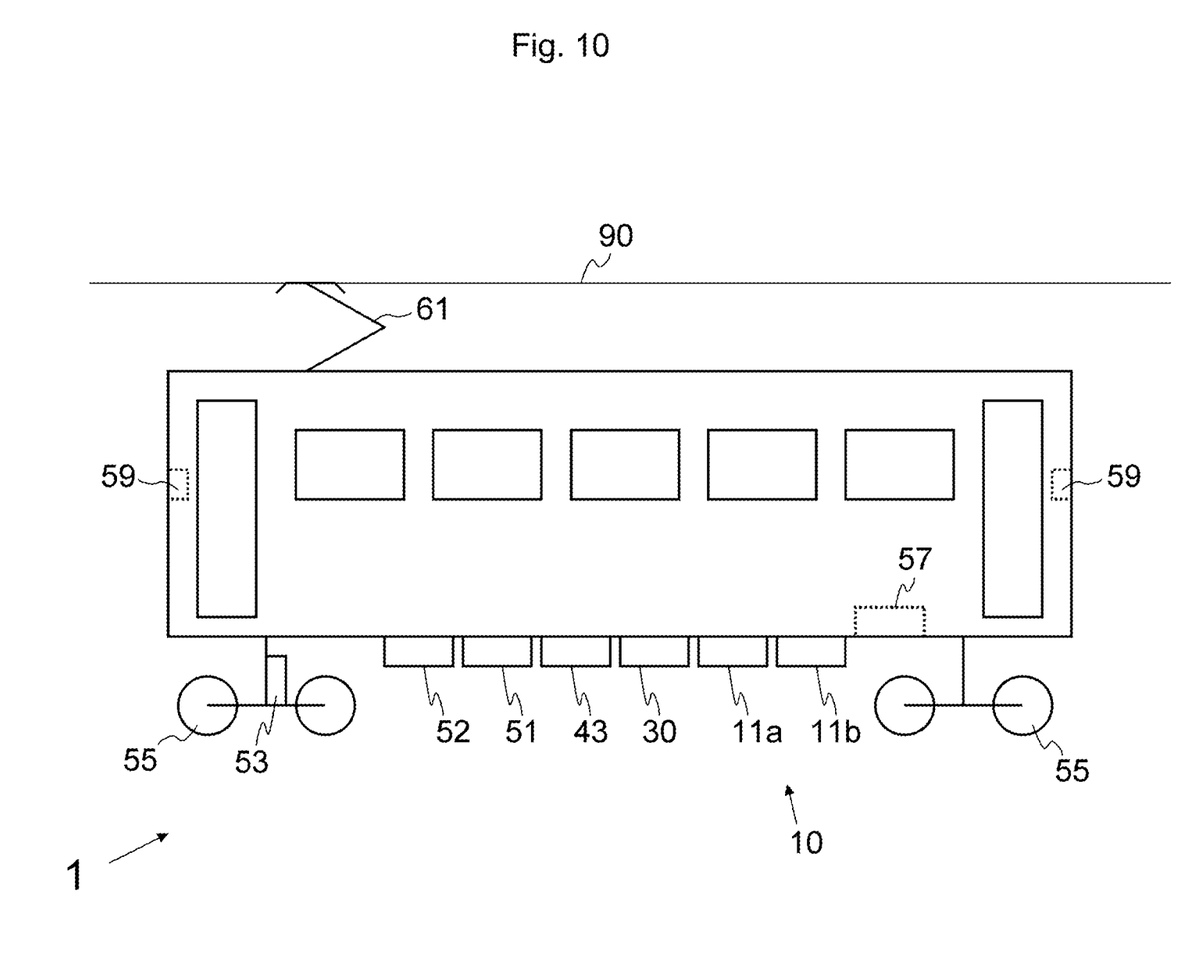
FIG. 10 is a side view of an electric vehicle according to a third embodiment.

The power generator 51 and the power storage 52 may also transmit electrical energy to the power transmission line 90 through the current collector 61.

REFERENCE SIGNS LIST

1 Electric vehicle
10 Dehydrogenation system
11a First tank (raw material (MCH) tank)
11b Second tank (fuel (MCH/TOL) tank)
12a Partition
12b Seal member
12c Actuator
13 First cartridge holder
13a First tray
13b First pin
13c First injection port
14 First cartridge tank
14a First discharge port
14c Raw material injection port
15 Cartridge holder
15a Second tray
15b Second pin
15c Second injection port
16 Cartridge tank
16a Second discharge port
17a Third tray
17b Third pin
17c Third injection port
18 Fuel supply unit
18a Third discharge port
19 Outside-air intake unit
21 Heat exchange unit
21a First heat exchanger
21b Second heat exchanger
29 Controller
30 Dehydrogenation reactor
31a First passage
31b Second passage
33a First catalyst (dehydrogenation catalyst)
33b Second catalyst (combustion catalyst)
35 Heater
36 Temperature sensor
41 Vapor-liquid separator
41a Gas outlet
41b Liquid outlet
43 Hydrogen tank
43a Inlet of hydrogen tank
43b Outlet of hydrogen tank
45 Pressure sensor
51 Power generator
52 Power storage
53 Motor
55 Wheel
57 Heating device
59 Operation unit
61 Current collector
90 Power transmission line

The invention claimed is:

1. An electric vehicle, comprising:
a first tank configured to store an organic hydride;
a dehydrogenation reactor having a first passage including
a first catalyst for accelerating dehydrogenation reaction of the organic hydride supplied from the first tank, the dehydrogenation reactor being configured to separate the organic hydride supplied to the first passage into hydrogen and an aromatic compound;

a power generator configured to generate electric power based on hydrogen supplied from the dehydrogenation reactor;

a power storage configured to store electric power generated by the power generator; and a motor drivable on electric power from at least one of the power generator and the power storage to rotate a wheel; and a second tank configured to store at least one of the aromatic compound resulting from separation of hydrogen from the organic hydride, and the organic hydride, wherein the second tank includes a holder fixed to the electric vehicle, and a cartridge tank attached to the holder in a detachable manner, and a discharge port which is urged in a closing direction and which is opened by press and an injection port which is urged in a closing direction are separately provided in the cartridge tank.

2. The electric vehicle according to claim 1, wherein the first tank includes a first holder fixed to the electric vehicle, and a first cartridge tank attached to the first holder in a detachable manner.

3. The electric vehicle according to claim 2, wherein the first holder includes a door in a region facing the first cartridge tank for introducing a liquid from the first cartridge tank into the first holder, and the door is urged upward in a closing direction and is opened by a weight applied from above.

4. The electric vehicle according to claim 2, wherein one of two sections in a single cartridge tank divided by a movable partition is used as the first cartridge tank and another of the two sections is used as the cartridge tank.

5. The electric vehicle according to claim 1, wherein a hydrogen tank to store hydrogen separated from the organic hydride through the dehydrogenation reactor is smaller than the first tank.

6. The electric vehicle according to claim 1, wherein one of two sections in a single tank divided by a movable partition is used as the first tank and another of the two sections is used as the second tank.

7. The electric vehicle according to claim 1, further comprising:
an outside-air intake unit;
a heat exchange unit including a first heat exchanger and a second heat exchanger; and
a heating device configured to heat an interior of the electric vehicle, wherein the dehydrogenation reactor has a second passage adjacent to the first passage, and the second passage includes a second catalyst for accelerating combustion of a mixture of the fuel supplied from the second tank and air supplied from the outside-air intake unit, heat resulting from combustion in the second passage is transferred to the first passage, the first heat exchanger and the second heat exchanger are located on a discharge path of the second passage, the first heat exchanger is used for heat exchange between heat discharged from the second passage and air drawn through the outside-air intake unit, and the second heat exchanger is used for heat exchange between heat discharged from the second passage and a heating medium in the heating device.

8. The electric vehicle according to claim 7, wherein the first heat exchanger is nearer an outlet of the second passage than the second heat exchanger.

9. The electric vehicle according to claim 7, wherein the holder includes a cartridge holder and a fuel supply unit, the cartridge tank is attached while being pinched vertically between the fuel supply unit and the cartridge holder, the cartridge holder connects communicatively with the second passage in the dehydrogenation reactor, and the fuel supply unit connects communicatively with a liquid outlet of the vapor-liquid separator.

10. The electric vehicle according to claim 9, wherein the discharge port is urged downward in a closing direction and is opened by press applied from below, and the injection port is urged upward in a closing direction is opened by a weight applied from above.

11. The electric vehicle according to claim 1, wherein the motor functions as an electric brake during braking, and the generated electric power is stored in the power storage.

12. The electric vehicle according to claim 1, further comprising:
a device connectable to a power transmission line,
wherein one of the power generator, the power storage, and the motor transmits electrical energy to the power transmission line through the device.

13. The electric vehicle according to claim 1, wherein the discharge port is urged downward in a closing direction and is opened by press applied from below, and the injection port is urged upward in a closing direction and is opened by a weight applied from above.

* * * * *